US006203344B1

United States Patent
Ito (10) Patent No.: US 6,203,344 B1
(45) Date of Patent: Mar. 20, 2001

(54) JACK, REPRODUCING APPARATUS AND DATA COMMUNICATION SYSTEM

(75) Inventor: Akashi Ito, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/271,343

(22) Filed: Mar. 18, 1999

(30) Foreign Application Priority Data

Mar. 7, 1998 (JP) .................................................. 10-081506

(51) Int. Cl.[7] .................................................. H01R 27/00
(52) U.S. Cl. ............................................. 439/218; 439/669
(58) Field of Search .............................. 439/63, 218, 578, 439/668, 669

(56) References Cited

U.S. PATENT DOCUMENTS

| 4,804,336 | 2/1989 | Miller et al. . | |
|---|---|---|---|
| 5,244,402 | * 9/1993 | Pasterchick, Jr. et al. | 439/217 |
| 5,387,135 | 2/1995 | Shen et al. . | |
| 5,415,570 | 5/1995 | Sarkissian . | |
| 5,454,734 | * 10/1995 | Eggert et al. | 439/578 |

FOREIGN PATENT DOCUMENTS

| 0 475 297 A2 | 3/1992 | (EP) . |
|---|---|---|
| 97/41624 | 11/1967 | (WO) . |

* cited by examiner

*Primary Examiner*—Khiem Nguyen
(74) *Attorney, Agent, or Firm*—Ronald P. Kananen; Rader, Fishman & Grauer (57) ABSTRACT

A jack is disclosed capable of selectively accommodating a first or a second plug, the first plug being used for data communication based on a first data communication standard, the second plug permitting data communication as per a second data communication standard. Also disclosed are a reproducing apparatus incorporating the jack and a data communication system furnished with the jack.

23 Claims, 5 Drawing Sheets

FRONT VIEW

FIG. 5B

SIDE VIEW

FIG. 5C

PLAN VIEW

FIG. 6A

FRONT VIEW

FIG. 6B

SIDE VIEW

FIG. 6C

PLAN VIEW

JACK, REPRODUCING APPARATUS AND DATA COMMUNICATION SYSTEM

BACKGROUND OF THE INVENTION

The present invention relates to a jack capable of selectively accommodating a plurality of types of plugs for communicating signals pursuant to different data communication standards; to a reproducing apparatus incorporating the jack; and to a data communication system including the jack.

Recent years have seen widespread acceptance of such digital audio equipment as MD (mini disc; a registered trademark) systems or DAT (digital audio tape) recorders. The digital audio equipment records and reproduces audio signals as digital audio data to and from a storage medium such as a disk or a magnetic tape.

Portable MD systems, DAT recorders and other portable digital audio equipment are also well-known. Typically, portable digital audio equipment requires connecting to the equipment body a set of headphones worn by a user to hear reproduced sound. Generally, a remote controller is provided as an operating part between the headphones and a plug. The remote controller allows the user to perform various operations including playback without directly manipulating keys on the equipment body. A display part may be located close to the controls of the remote controller, allowing the user to check the current playback status and other operating conditions.

Generally, the headphone cable comprises a plug-equipped line for data communication between the remote controller and the digital audio equipment in addition to an audio signal line. The data communication line is connected by the plug to transmit operations by the remote controller to the digital audio equipment and to give indications on the display part of the remote controller.

The equipment body includes a jack as a connector into which to insert illustratively a plug of the headphone cable. The plug and the jack both have electrodes for audio signal transmission and for data communication for use with the remote controller.

Recently, a communication standard called TSB (time sharing bus) is used extensively as a data communication standard addressing remote controllers. The TSB addresses data communication between a master and a slave device. Communication through the TSB involves the use of four lines: a ground line, a data line, a key input line, and a power supply line. The key input line conveys information to the equipment telling the latter which keys were operated on the operating part. The data line transmits contents to be displayed primarily to the display part in the form of serial data. There is no dedicated clock line; a clock signal is tapped from the data line. One-bit data is illustratively made up of a 12-unit serial data part, each unit driven High or Low for 16 $\mu$s (16×12=192 $\mu$s), and a clock period of a High and a Low level, each level lasting 16 $\mu$s (16×2=32 $\mu$s). That is, one-bit data has a length of 224 $\mu$s (=192+32), corresponding to a transfer rate of about 4,464 bps. With the TSB, eight bits constitute one byte. Ten bytes of data make up one packet. Prefixed to each packet are a sync signal indicating the beginning of the packet, a request signal requesting data between the master and the slave device, and a direction signal designating the direction of data sent from one device to the other.

The digital audio equipment above is capable of inputting and recording digital audio data to a storage medium and outputting to the outside digital audio data reproduced from the storage medium.

A data communication standard IEEE (Institute of Electrical and Electronic Engineers) 1394 providing for data transmissions as fast as 100 Mbps may be adopted for the input and output of digital audio data. Where functions addressing such a high-speed data communication standard as opposed to the TSB are to be incorporated in MD systems, DAT recorders or other portable digital audio equipment, the following problems can arise:

For example, suppose that the data communication functions based on the IEEE 1394 standard are adopted by portable digital audio equipment. This requires adding a connector compatible with IEEE 1394 to the equipment.

Adding a data communication connector anew to the portable digital audio equipment is disadvantageous since the equipment needs to be made smaller than ever for enhanced portability. As it is, the equipment will have difficulty allocating space in which to accommodate any connector compatible with IEEE 1394.

Conceivably, the data communication connector mounted on the existing portable digital audio equipment could be used unmodified as a dual-purpose connector additionally addressing data communication pursuant to IEEE 1394. However, this option is not very practical. The reason is that the TSB communication standard is currently used for data communication between the existing portable digital audio equipment and its remote controller and that there is no compatibility in terms of physical specifications or communication protocols between the TSB standard and IEEE 1394. Generally, it is very difficult to make the connector serve for a plurality of applications if their physical specifications and communication protocols are not in common. Meanwhile, where two units of digital audio equipment are to be connected for data communication, each unit needs to be furnished with batteries, an AC adapter or like power supply resources in order to ensure the separate supply of power to the individual units. As today's portable digital audio equipment is getting smaller in size, connectors on the equipment also need to be made smaller. This can promote fragility of the set of portable equipment connectors as opposed to large connectors of stationary type equipment.

It is therefore an object of the present invention to overcome the above drawbacks and disadvantages of the prior art and to provide a jack capable of addressing a plurality of data communication standards without occupying additional connector space on equipment, as well as a reproducing apparatus comprising that jack.

SUMMARY OF THE INVENTION

In carrying out the invention and according to one aspect thereof, there is provided a jack comprising: an opening for selectively accommodating either a first plug or a second plug, the first plug having a plurality of first electrode terminals for performing data communication based on a first data communication standard, the second plug having a plurality of second electrode terminals for effecting data communication based on a second data communication standard; a plurality of first contacts for coming into contact with the plurality of first electrode terminals of the first plug when the first plug is inserted into the opening; and a plurality of second contacts for coming into contact with the plurality of second electrode terminals of the second plug when the second plug is inserted into the opening. According to another aspect of the invention, there is provided a reproducing apparatus incorporating the jack outlined above. According to a further aspect of the invention, there is provided a data communication system comprising the jack.

These and other objects, features and advantages of the invention will become more apparent upon a reading of the following description and appended drawings.

DESCRIPTION OF THE PREFERRED EMBODIMENTS

Preferred embodiments of this invention will now be described in the form of a data communication jack and a data communication plug.

It is assumed that the data communication jack and data communication plug embodying the invention are attached to units of digital audio equipment or to ends of a cable for exchanging digital audio data between the equipment units.

It is also assumed that the digital audio equipment furnished with the data communication jack embodying the invention is a recording and reproducing apparatus capable of writing and reading data to and from an MD that is a magneto-optical disk.

The embodiments of this invention are assumed to adopt IEEE 1394 as the data communication standard for digital audio data.

Figure 1:
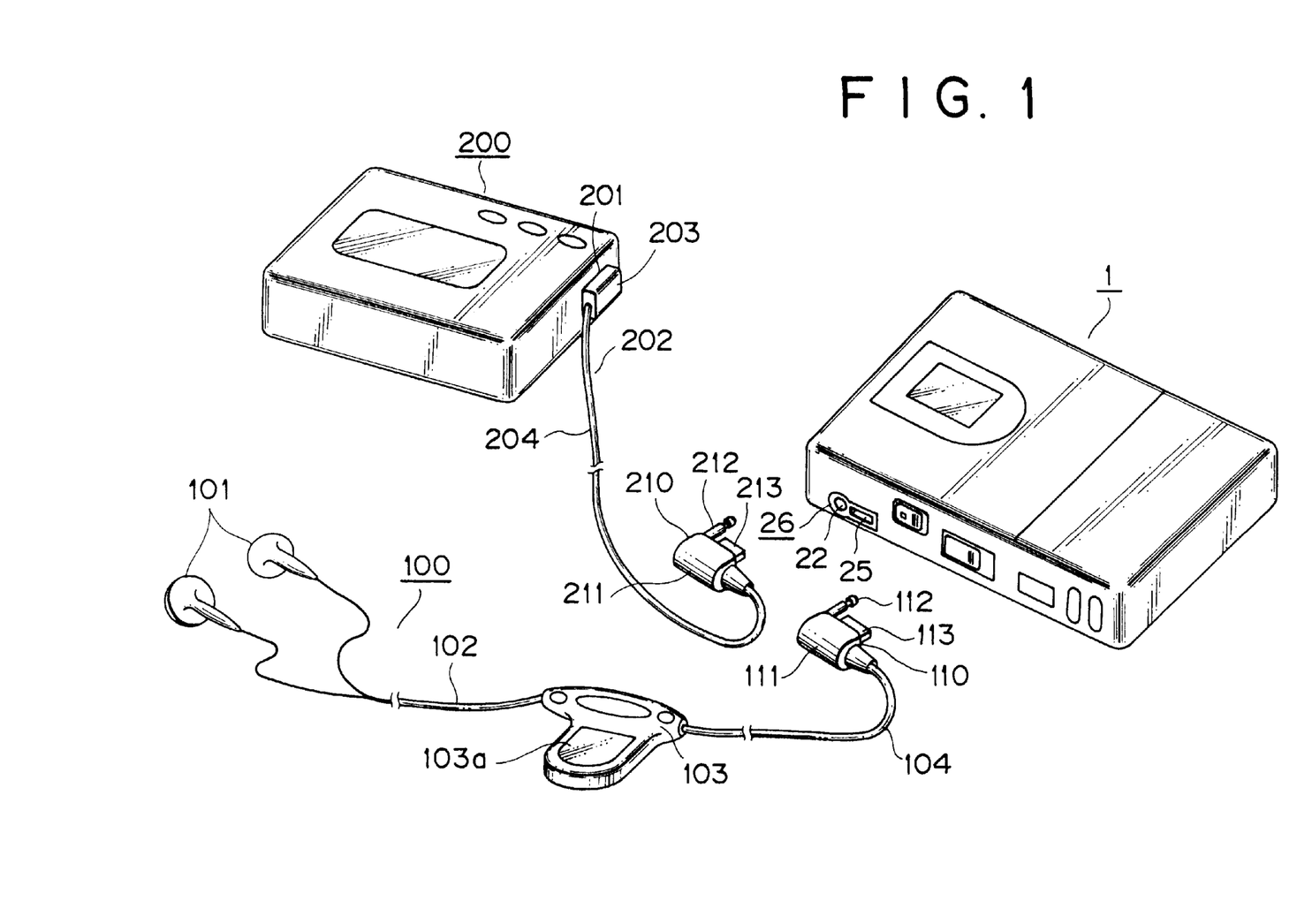
FIG. 1 is a perspective view of a typical data communication system to which the invention applies.

The description that follows will be in the following order:
1. System Configuration
2. Recording and Reproducing Apparatus
3. Structure of MD Jack
4. Headphone Plug and Remote Controller Plug
5. Data Communication Plug 1. System Configuration FIG. 1 shows a typical configuration of a data communication system to which the invention applies. In FIG. 1, a recording and reproducing apparatus 1 is a portable minidisk player capable of writing and reading data to and from an MD (mini-disk, a registered trademark; simply referred to as the disk hereafter).

The recording and reproducing apparatus 1 has an MD jack 26. As illustrated, the MD jack 26 is furnished with a headphone jack 22 and a data connector 25 exposed on the apparatus 1. The MD jack 26 as embodied here is so structured as to accommodate either a headphone plug and a remote controller plug 110 or a data communication plug 210. The headphone plug and remote controller plug 110 are attached to an end of remote controller-equipped headphones 100, and the data communication plug 210 is at one end of a data communication cable.

An internal structure of the recording and reproducing apparatus 1 and a structure of the MD jack 26 will be described later.

The remote controller-equipped headphones 100 are designed to let a user hear sound reproduced from the disk by the recording and reproducing apparatus 1 and to permit primarily reproduction-related operations on the apparatus 1.

As illustrated in FIG. 1, the remote controller-equipped headphones 100 have ear drivers 101 for outputting reproduced sound and a remote controller 103 for allowing the user to perform reproduction-related and other operations on the recording and reproducing apparatus 1, the ear drivers 101 and the remote controller 103 being connected by a cable 102. The remote controller 103 and the headphone plug and remote controller plug 110 are connected by a cable 104.

Illustratively, the remote controller 103 comprises various keys by which to perform operations on the recording and reproducing apparatus 1 such as playback, stop, pause, fast forward and rewind. On the remote controller 103, a display part 103a is provided to indicate information in accordance with the current operation of the apparatus 1.

The headphone plug and remote controller plug 110 of the remote controller-equipped headphones 100 have their plug body 111 furnished with a headphone plug 112 connectable to the headphone jack 22 and with a connector 113 connectable to the data connector 25.

Connecting the headphone plug and remote controller plug 110 to the MD jack 26 enables data communication between the remote controller 103 and the recording and reproducing apparatus 1. Display data is transmitted from the apparatus 1 to the display part 103a which gives indications accordingly. Operation information obtained by operations of the remote controller 103 is transmitted to the recording and reproducing apparatus 1.

An analog audio signal output from the recording and reproducing apparatus 1 is connected to the ear drivers 101.

Suppose that with a disk loaded into the recording and reproducing apparatus 1, the user operates the remote controller 103 to initiate the reproduction of disk data. In that case, the operation information is transmitted to the apparatus 1 which starts reproducing data from the disk. In turn, the sound reproduced by the recording and reproducing apparatus 1 from the disk is output from the ear drivers 101 of the remote controller-equipped headphones 100. The display part 103a displays relevant indications such as the current reproduced track, playback time, and other information.

In the above setup, a data input and output device 200 may be included as another digital audio equipment such as an MD player or a DAT recorder different from the recording and reproducing apparatus 1. The device 200 should be capable of transmitting and receiving digital audio data pursuant to IEEE 1394.

A data communication cable 202 comprises data communication plugs 203 and 210 connected by a cable 204 in the setup above. The data communication plug 203 is so shaped and structured as to be connectable to a data communication jack 201 of the data input and output device 200. The data communication plug 210 is shaped and structured to permit connection to the MD jack 26 of the recording and reproducing apparatus 1.

The data communication plug 210 has its plug body 211 furnished with a headphone plug 212 connectable to the headphone jack 22 and with a connector 213 connectable to the data connector 25.

In a typical operation setting known as dubbing, digital audio data reproduced by the data input and output device 200 is input to the recording and reproducing apparatus 1 for recording. The operation is carried out specifically as follows:

The user first connects the data input and output device 200 with the recording and reproducing apparatus 1 using the data communication cable 202. That is, the data communication jack 201 of the data input and output device 200 is connected to the data communication plug 203, and the MD jack 26 of the apparatus 1 is connected to the data communication plug 210.

With the recording and reproducing apparatus 1 activated for recording in digital input mode, the data input and output device 200 is started to reproduce data in synchronism.

The digital audio data reproduced by the data input and output device 200 from a storage medium are input to the recording and reproducing apparatus 1 through the data communication cable 202. The apparatus 1 records the input digital audio data onto a disk. This is how the dubbing of digital audio data typically takes place.

The recording and reproducing apparatus 1 outputs two kinds of signal data: data to be transmitted pursuant to IEEE 1394, and data to be transmitted as per the TSB standard, the data transmission being carried out serially. The MD jack 26 accommodates either the headphone plug and remote controller plug 110 or the data communication plug 210. Whichever plug is inserted into the jack 26, only the data corresponding to the connected plug become effective. The relevant contacts in the jack and the electrode terminals of the inserted plug come into contact, causing appropriate lines effectively to conduct and allowing the recording and reproducing apparatus 1 to receive data pursuant to the standard corresponding to the connected plug.

The arrangements above permit two different data communication standards to be addressed without implementing specialized data detecting methods.

Structures of the headphone plug and remote controller plug 110 and data communication plug 210 shown in FIG. 1 constitute a distinct feature of the embodiment and will be described later in more detail.

The system configuration in FIG. 1 is only an example and, as mentioned above, the data input and output device 200 as digital audio equipment is not limited in type. Likewise, the recording and reproducing apparatus 1, remote controller-equipped headphones 100 and data communication cables are not limited to their specific shapes or structures shown in FIG. 1.

2. Recording and Reproducing Apparatus

A typical structure of the mini disc recording and reproducing apparatus 1 to which the invention applies will now be described with reference to FIG. 2.

A magneto-optical disk (e.g., mini disc) 90 on which audio data is recorded is rotated by a spindle motor 2. During data recording and reproduction, an optical head 3 emits a laser beam onto the magneto-optical disk 90.

For data recording, the optical head 3 provides a high-level laser output to heat recording tracks up to the Curie temperature. For data reproduction, the optical head 3 outputs a laser beam at a relatively low level to detect data from reflected light through the magnetic Kerr effect.

The optical head 3 has an optical system and a detector arrangement. The optical system includes a laser diode as laser outputting means, a polarization beam splitter and an objective lens. The detector arrangement comprises detectors to detect reflected light. An objective lens 3a is supported movably by a dual axis mechanism 4 both in the radial direction of the disk and in the direction in which to approach and retract from the disk.

A magnetic head 6a is positioned opposite to the optical head 3 across the disk 90. The magnetic head 6a applies a magnetic field modulated by supplied data onto the magneto-optical disk 90.

The optical head 3 as a whole and the magnetic head 6a are moved by a sled mechanism 5 in the radial direction of the disk.

During a reproducing operation, information detected by the optical head 3 from the disk 90 is supplied to an RF amplifier 7. The RF amplifier 7 processes the supplied information and extracts therefrom a reproduced RF signal, a tracking error signal TE, a focus error signal FE, and groove information GFM (groove frequency modulation) that is absolute position information recorded as pre-grooves (i.e., wobbling grooves) on the magneto-optical disk 90.

The reproduced RF signal thus extracted is fed to an EFM (eight-to-fourteen modulation) and ACIRC (advanced cross interleave Reed-Solomon code) encoder and decoder 8. The tracking error signal TE and focus error signal FE are supplied to a servo circuit 9. The groove information GFM is sent to an address decoder 10.

The servo circuit 9 generates various servo drive signals based on the supplied tracking error signal TE and focus error signal FE, on a track jump command and an access command from a system controller 11 having a microcomputer, and on detected rotating speed information from the spindle motor 2. In generating the drive signals, the servo circuit 9 places the dual axis mechanism 4 and sled mechanism 5 under focusing and tracking control. The servo circuit 9 also controls the spindle motor 2 at a constant linear velocity (CLV).

The address decoder 10 decodes the supplied groove information GFM to extract address information. The address information is fed to the system controller 11 for use in diverse control operations.

The reproduced RF (radio frequency) signal is subjected to EFM demodulation, ACIRC decoding or like decoding processes by the EFM and ACIRC encoder and decoder 8. At this point, addresses and sub-code data are also extracted and supplied to the system controller 11.

Following the EFM demodulation, ACIRC decoding or other decoding processes by the EFM and ACIRC encoder and decoder 8, the decoded digital audio data (i.e., sector data) is written to a buffer memory 13 for the moment by a memory controller 12. The data read by the optical head 3 from the disk 90 is transferred, normally in an intermittent manner at 1.41 Mbits/sec., from the optical head 3 to the buffer memory 13.

The data written to the buffer memory 13 is read in a timed relationship such that the reproduced data is transferred at 0.3 Mbits/sec., and is sent to an audio data compression encoder and decoder 14. Given the data, the encoder and decoder 14 carries out signal processing such as the decoding of compressed audio data to provide a 16-bit quantized digital audio signal at a sampling rate of 44.1 kHz.

The digital audio signal is converted to an analog audio signal by a digital/analog converter 15. The analog audio signal enters an output processor 16 for level and impedance adjustment. The output processor 16 outputs the resulting analog audio signal Aout via a line output terminal 17 to an external device. The analog audio signal output from the output processor 16 is also fed to a headphone (HP) amplifier 18. The output of the headphone amplifier 18 is sent to the headphone jack 22. As shown in FIG. 1, the headphone jack 22 constitutes part of the MD jack 26.

Illustratively pursuant to IEEE 1394, the recording and reproducing apparatus 1 may digitally output digital audio data reproduced from the disk 90 to the outside without converting the data to an analog signal. This capability of the apparatus 1 will be described later in more detail.

An analog audio signal may be input and recorded to the magneto-optical disk 90 as follows: a record signal (i.e., analog audio signal Ain) fed to a line input terminal 20 is first converted to digital data by an analog/digital converter 19. The digital data is supplied to the audio data compression encoder and decoder 14 for audio data compression encoding.

As will be described later, digital audio data supplied via an electrode terminal 14 for data input is also handled as record data.

It is obvious that a microphone input terminal, although not shown, may be provided to handle a microphone input as a record signal.

The record data compressed by the audio data compression encoder and decoder 14 is written by the memory controller 12 to the buffer memory 13 for temporary storage therein. Later, the record data is read out in predetermined data units and sent to the EFM and ACIRC encoder and decoder 8. The data are subjected to ACIRC encoding, EFM or like encoding processes by the EFM and ACIRC encoder and decoder 8 before being fed to a magnetic head drive circuit 6.

Given the encoded record data, the magnetic head drive circuit 6 supplies a magnetic head drive signal to the magnetic head 6a in response. Specifically, the drive circuit 6 causes the magnetic head 6a to apply a north or a south magnetic field onto the magneto-optical disk 90. At this point, the system controller 11 feeds a control signal to the optical head so that the latter will output a laser beam at the recording level.

The recording and reproducing apparatus 1 embodying the invention comprises a remote controller connector 23 and a data communication connector 24 constituting the data connector 25 as a circuit in the MD jack 26 shown in FIG. 1.

The remote controller connector 23 illustratively has four terminals, T1 through T4, to accommodate the connector 113 of the headphone plug and remote controller plug 110 that may be inserted.

In the remote controller connector 23, the terminal T1 is connected to a ground line; terminal T2 is connected to an RC data line for transmitting RC data, i.e., display control data, to the display part 103a; terminal T3 is connected to a key input data line for transmitting key input data, i.e., operation information, from the remote controller 103; and terminal T4 is connected to a power supply line by which the recording and reproducing apparatus 1 powers the remote controller 103 including the display part 103a.

The data communication connector 24 is designed to transmit digital audio data pursuant to IEEE 1394. The connector 24 illustratively has six electrode terminals, T11 through T16 in the makeup of FIG. 2, to accommodate the connector 213 of the data communication plug 210.

In the data communication connector 24, the terminal T11 is connected to a ground line; terminal T12 is connected to a data output line for outputting data from the recording and reproducing apparatus 1; terminal T13 is connected to a ground line paired with the data output line; terminal T14 is connected to a data input line for inputting data to the recording and reproducing apparatus 1; terminal T15 is connected to a ground line paired with the data input line; and terminal T16 is connected to a power supply line by which a power supply part 31 of the apparatus 1, to be described later, is powered externally or by which the power supply part 31 supplies power to the outside.

A data encoder and decoder 21 is a circuit that carries out encoding and decoding processes on digital audio data that are input and output pursuant to IEEE 1394.

If digital audio data is input from the outside via the terminal T14, the data encoder and decoder 21 decodes the input data based on IEEE 1394 to conform to a format compatible with the recording and reproducing apparatus 1. The decoded data is transmitted as record data to the EFM and ACIRC encoder and decoder 8 or to the audio data compression encoder and decoder 14.

The data encoder and decoder 21 transmits data to the EFM and ACIRC encoder and decoder 8 if the input digital audio data is data already compressed illustratively by ATRAC (Adaptive Transform Acoustic Coding), an audio data compression format compatible with the MD system. In that case, the data is output typically at a bit rate corresponding to a transfer clock rate of the EFM and ACIRC encoder and decoder 8.

The data encoder and decoder 21 transmits data to the audio data compression encoder and decoder 14 if the input digital audio data are uncompressed data. In such a case, the data is output typically at a bit rate corresponding to a transfer clock rate of the audio data compression encoder and decoder 14.

If audio data reproduced by the recording and reproducing apparatus 1 from the disk 90 is to be output to the outside, the data encoder and decoder 21 receives compressed audio data from the EFM and ACIRC encoder and decoder 8 or uncompressed audio data from the audio data compression encoder and decoder 14, encodes the received data to conform to a transmission format pursuant to IEEE 1394, and outputs the encoded data to the terminal T12 at a predetermined bit rate.

An operating part 29 has various operation keys with which the user specifies recording, reproducing, editing and other operations.

More specifically, the operating part 29 comprises a playback key, a recording key, a stop key, an AMS(Auto Music Sensor)/search key, a pause key, an edit mode key, edit operation keys and a display mode key. There are also keys and dials for inputting disk titles, track names and other information. The edit operations available with the operating part 29 include track name input, disk name input, track division, track concatenation, track shift (i.e., modification of track numbers in playback sequence) and track erasure. The keys and dials necessary for designating such edit operations are provided on the operating part 29.

Figure 2:
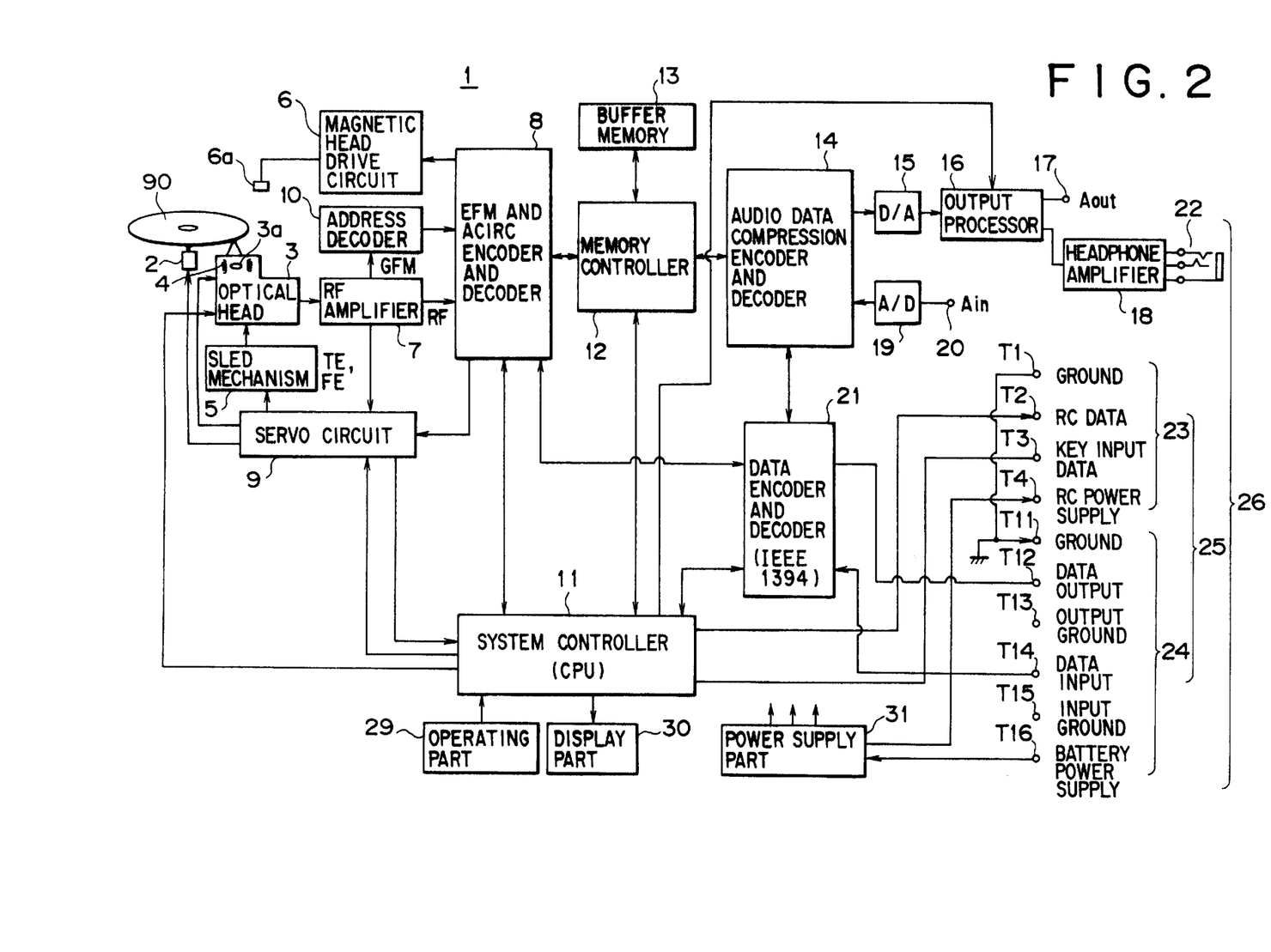
FIG. 2 is a block diagram of a recording and reproducing apparatus incorporating a data communication jack embodying the invention.

The operation information generated by manipulation of keys and dials on the operating part 29 and the operation information input from the remote controller 103 of the remote controller-equipped headphones 100 in FIG. 1 via the terminal T3 is supplied to the system controller 11 in FIG. 2. Given the operation information, the system controller 11 carries out relevant operations accordingly.

A display part 30 is illustratively furnished on an equipment enclosure. Display operations are controlled by the system controller 11.

In carrying out a display operation, the system controller 11 transmits display data to a display driver in the display part 30. In accordance with the supplied data, the display driver drives the display part such as a liquid crystal display panel to display numerals, characters and symbols thereon.

Similarly, display control data is output via the terminal T2 to the display part 103a of the remote controller-equipped headphones 100 shown in FIG. 1. This causes the display part 103a to indicate relevant information thereon.

The system controller 11 in FIG. 2 is constituted by a microcomputer comprising a CPU (central processing unit), a program ROM, a work RAM and an interface. The operations described above are controlled by the system controller 11.

To record and reproduce data to and from the disk 90 requires reading management information, i.e., P-TOC (pre-mastered table of contents) and U-TOC (user TOC) from the disk 90. Given such management information, the system controller 11 recognizes addresses of areas to which to record data or from which to reproduce data on the disk 90.

The management information from the disk is retained in the buffer memory 13. The system controller 11 first reads out management information from the disk 90 by performing a reproducing operation on the innermost disk area where the management information (TOC) is recorded. The management information thus reproduced is placed into the buffer memory 13 and later referenced for recording, reproducing and editing operations on the disk 90.

The U-TOC is updated to reflect data records and various editing processes performed. Every time a recording or an editing operation is carried out, the system controller 11 updates the U-TOC information in the buffer memory 13. In properly timed relation with the update operation, the U-TOC area on the disk 90 is also updated.

3. Structure of MD Jack

Figure 3:
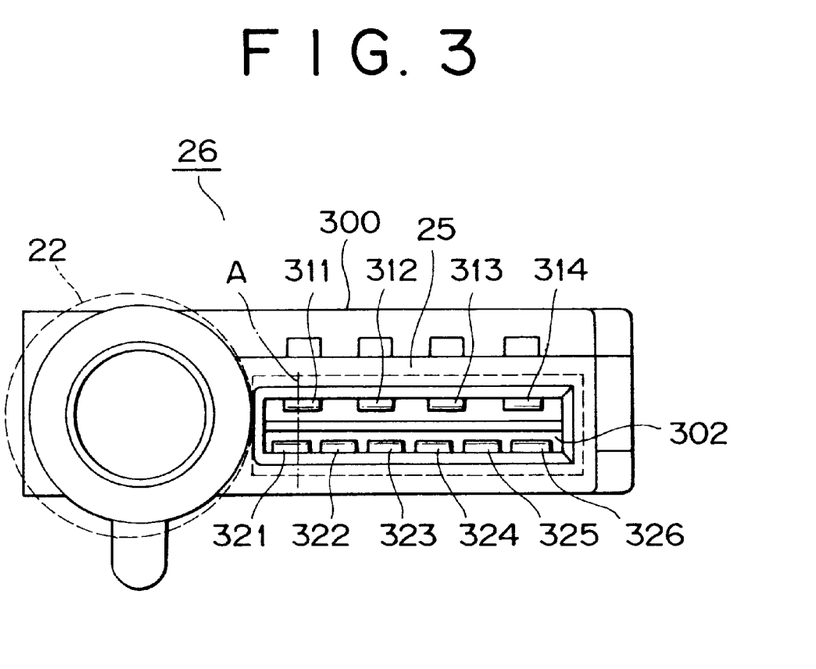
FIG. 3 is a front view of a data communication jack embodying the invention.

FIG. 3 is a front view of the MD jack 26 which embodies the invention and which is attached to the recording and reproducing apparatus 1. The MD jack 26 is furnished so that its front portion shown in FIG. 3 is exposed on the body of the apparatus 1.

As illustrated in FIG. 3, the MD jack 26 has a case block 300 illustratively made of plastic resin or similar substance, the case block 300 being roughly divided into the headphone jack 22 and data connector 25 formed in an integral structure.

In this embodiment, the MD jack 26 accommodates a plug integrally comprising a headphone jack and a data communication connector being paired.

The MD jack 26, when structured as described above, is sturdier than if the headphone jack 22 and data connector 25 were separately provided. An integral formation of a plurality of such components makes it possible to improve the efficiency of parts management during fabrication and to enhance the productivity of device assembling.

In FIG. 3, a connector opening (i.e., plug inserting position) 302 of the data connector 25 is substantially rectangular when viewed from the front. An upper part of the opening has four electrode terminals 311, 312, 313 and 314 furnished as illustrated in FIG. 3. On the lower part of the opening has six electrode terminals 321, 322, 323, 324, 325 and 326 arranged as indicated in FIG. 3.

In the above makeup, the electrode terminals 311, 312, 313 and 314 on the upper part of the connector opening 302 correspond as circuit elements to the remote controller connector 23 shown in FIG. 2. Each of the electrode terminals 311, 312, 313 and 314 is connected to one of the terminals T1, T2, T3 and T4 in FIG. 2.

The electrode terminals 321, 322, 323, 324, 325 and 326 on the lower part of the connector opening 302 correspond as circuit elements to the data communication connector 24 shown in FIG. 2. Each of the electrode terminals 311, 312, 313 and 314 is connected to one of the terminals T11, T12, T13, T14, T15 and T16 in FIG. 2.

Figure 4:
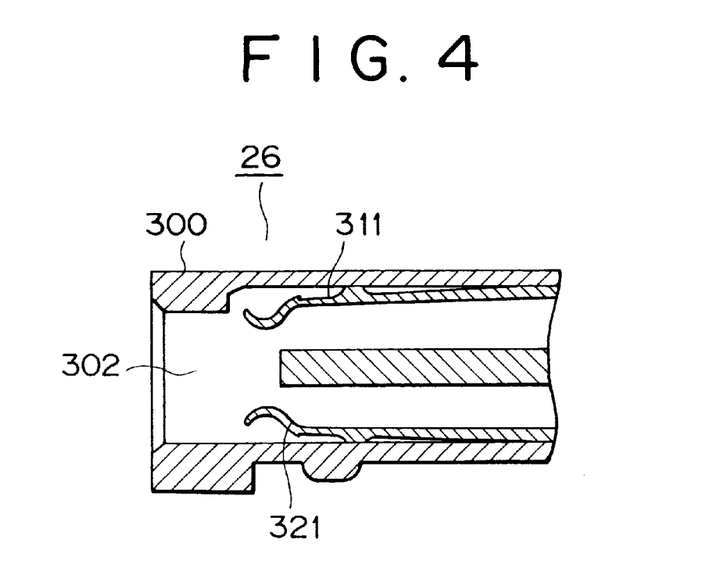
FIG. 4 is a cross-sectional view showing an internal structure of the inventive data communication jack.

FIG. 4 is a cross-sectional view taken on dashed line A in FIG. 3. As illustrated in FIG. 4, the electrode terminal 311 corresponding to the remote controller connector 23 is attached to the upper wall surface inside the connector opening 302. The electrode terminal 321 corresponding to the data communication connector 24 is furnished on the lower wall surface in the opening 302. The remaining electrode terminals 312, 313 and 314 as well as the terminals 322, 323, 324, 325 and 326 are furnished likewise on the upper or lower wall surface inside the opening 302.

4. Headphone Plug and Remote Controller Plug

Figure 5A:
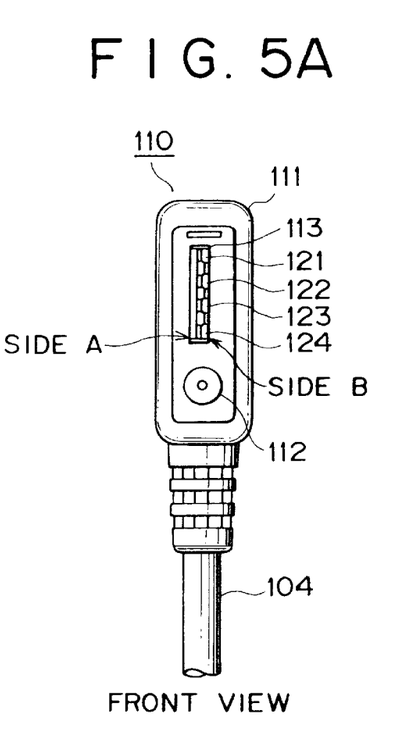
FIG. 5A is a front view of a headphone plug and a remote controller plug embodying the invention.
Figure 5B:
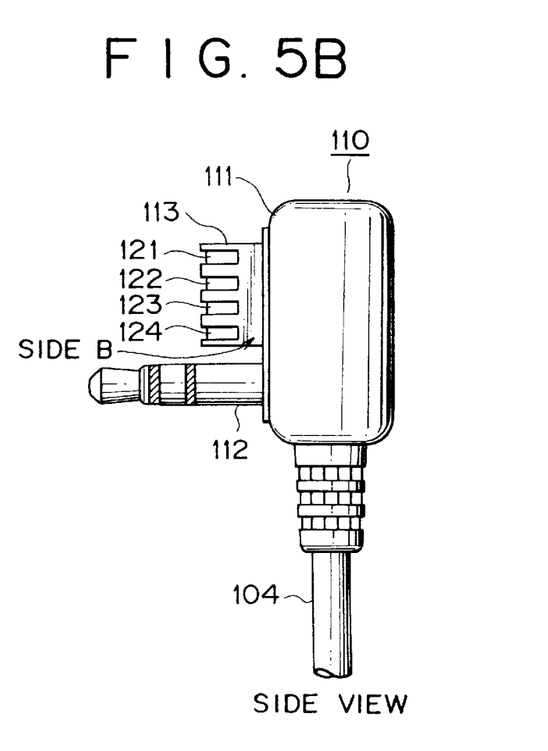
FIG. 5B is a side view of the inventive headphone plug and remote controller plug.
Figure 5C:
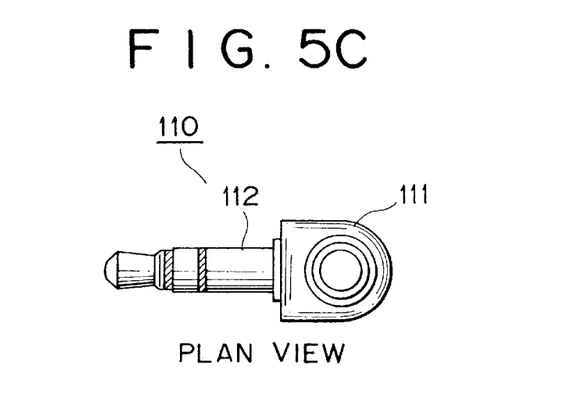
FIG. 5C is a plan view of the inventive headphone plug and remote controller plug.

FIG. 5A is a front view of a headphone plug and a remote controller plug 110 embodying the invention; FIG. 5B is a side view of the inventive headphone plug and remote controller plug 110; and FIG. 5C is a plan view of inventive headphone plug and remote controller plug 110. Of the reference numerals in FIGS. 5A, 5B and 5C, those already used in FIGS. 1 and 2 designate like or corresponding parts.

The headphone plug and remote controller plug 110 have their plug body 111 formed integrally with a stereo headphone plug 112 and the connector 113 as illustrated in FIGS. 5A, 5B and 5C.

In FIG. 5A in which the connector 113 is viewed from front, the left-hand side is assumed to be side A and right-hand side to be side B. As shown in FIGS. 5A 5B, the connector 113 has electrode terminals 121, 123 and 124 furnished only on side B, with no trode terminal provided on side A.

Lines stemming from the electrode terminals 121 through 124 pass inside the cable 104 and are connected to circuits of the remote controller 103 and display part 103a shown in FIG. 1.

Lines stemming from the headphone plug 112 pass inside de the cable 104 and are connected to the ear drivers 101 shown in FIG. 1.

When the headphone plug and remote controller plug 110 is inserted into the MD jack 26, the headphone plug 112 is inserted into the headphone jack 22 at the same time that the connector 113 is inserted into the connector opening 302 of the MD jack 26 shown in FIG. 3.

In the above makeup, the ear drivers 101 of the remote controller-equipped headphones 100 are connected as circuits to the headphone amplifier 18 of the recording and reproducing apparatus 1.

With the connector 113 inserted into the connector opening 302 of the MD jack 26 shown in FIG. 3, the electrode terminals 121, 122, 123 and 124 of the connector 113 come into contact respectively with the electrode terminals 311, 312, 313 and 314 on the upper wall side of the connector opening 302.

As a result, the remote controller connector 23 on the side of the recording and reproducing apparatus 1 is connected to circuits in the remote controller 103 and display part 103a of the remote controller-equipped headphones 100. The connection allows the user manipulating the remote controller-equipped headphones 100 to operate the apparatus 1 and enables the ear drivers 101 to output reproduced sound, as described earlier with reference to FIG. 1.

Since the electrode terminals 321, 322, 323, 324, 325 and 326 on the lower wall side of the connector opening 302 are free of contact with any of the electrode terminals of the connector 113, the terminals T11 through T16 in FIG. 2 are left open. This means that the data communication functions based on IEEE 1394 remain disabled.

5. Data Communication Plug

Figures 6A, 6B:
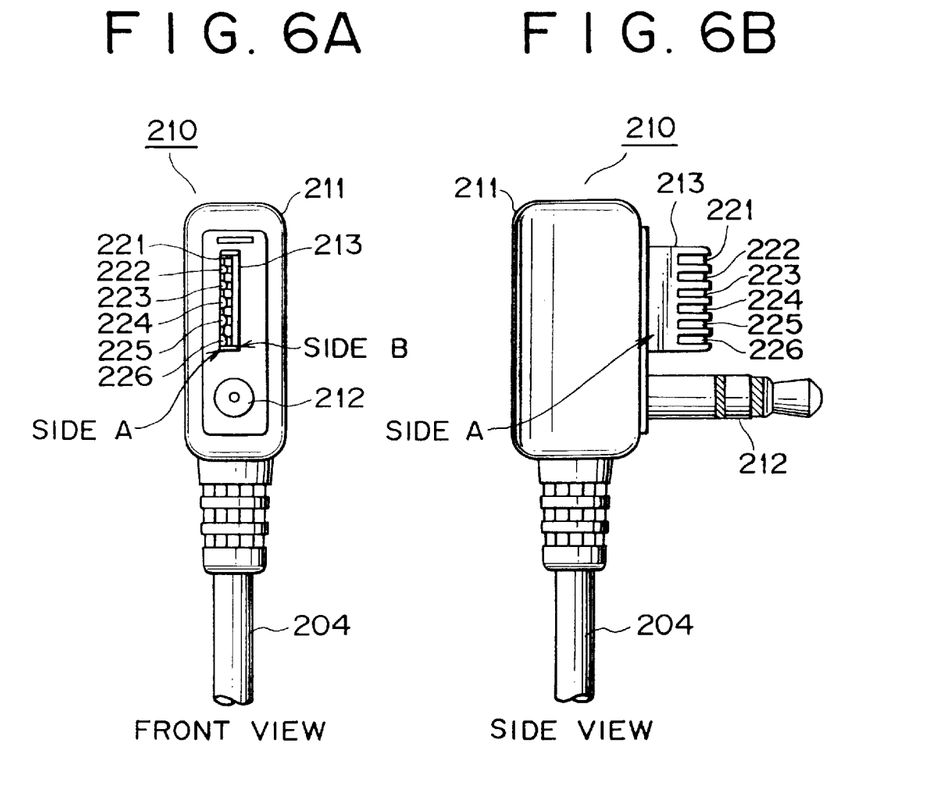
FIG. 6A is a front view of a headphone plug and a data communication plug embodying the invention.
FIG. 6B is a side view of the inventive headphone plug and data communication plug.
Figure 6C:
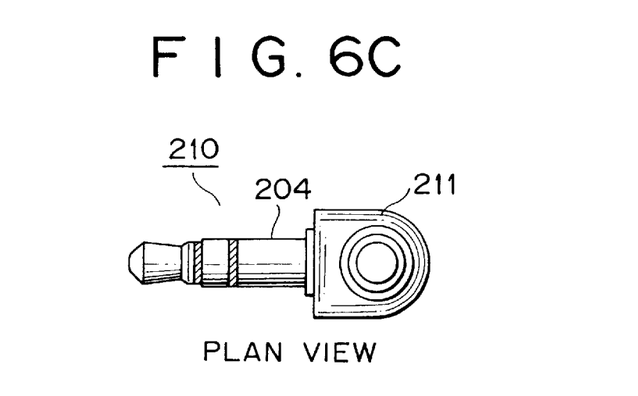
FIG. 6C is a plan view of the inventive headphone plug and data communication plug.

FIG. 6A is a front view of a data communication plug 210 which embodies the invention and which is attached to the data communication cable 202; FIG. 6B is a side view of the inventive data communication plug 210; and FIG. 6C is a plan view of the inventive data communication plug 210. Of the reference numerals in FIGS. 6A, 6B and 6C, those already used in FIGS. 1 and 2 designate like or corresponding parts.

The data communication plug 210 also has its plug body 211 formed integrally with a stereo headphone plug 212 and the connector 213 as illustrated in FIGS. 6A, 6B and 6C.

In FIG. 6B in which the connector 213 is viewed from the front, the left-hand side is assumed to be side A and the right-hand side to be side B. As shown in FIGS. 6A and 6B, the connector 213 has electrode terminals 221, 222, 223, 224, 225 and 226 furnished only on side A, with no electrode terminal provided on side B. That is, the necessary electrode terminals are furnished on the opposite side of those of the connector 113 for the headphone plug and remote controller plug 110 shown in FIGS. 5A through 5C.

Lines stemming from the electrode terminals 221 through 226 pass inside the cable 204 and are connected to the six electrode terminals furnished to the data communication plug 203 at the other end of the cable shown in FIG. 1.

In the case above, the headphone plug 212 remains a dummy plug from which no line is drawn from inside the cable 204.

When the data communication plug 210 is inserted into the MD jack 26, the headphone plug 212 is inserted into the headphone jack 22 at the same time that the connector 213 is inserted into the connector opening 302 on the side of the MD jack 26 shown in FIG. 3.

In the connected state above, the terminals of the headphone jack 22 are actually left open. There is no audio signal output effected through the data communication cable 202.

With the connector 213 is inserted into the connector opening 302 of the MD jack 26, the electrode terminals 221 through 226 of the connector 213 come into contact respectively with the electrode terminals 321 through 326 on the upper wall side of the connector opening 302.

As a result, the data communication connector 24 of the recording and reproducing apparatus 1 is connected with the data input and output device 200 shown in FIG. 1, via the data communication cable 202. The connection permits interchanges of audio data between the apparatus 1 and the data input and output device 200 illustratively in accordance with IEEE 1394.

Since the electrode terminals 311 through 314 on the upper wall side of the connector opening 302 are free of contact with any of the electrode terminals of the connector 213 in the above makeup, the terminals T1 through T4 in FIG. 2 are left open. That is, no transmission of remote controller data is undertaken by the recording and reproducing apparatus 1; only its data communication functions based on IEEE 1394 are enabled.

In the arrangement above, inserting the headphone plug and remote controller plug 110 of the remote controller-equipped headphones 100 in FIG. 1 into the MD jack 26 in FIG. 3 allows the user to hear sound reproduced by the ear drivers while operating the remote controller; inserting the data communication plug 210 of the data communication cable 202 into the MD jack 26 constitutes a system capable of audio data exchanges pursuant to IEEE 1394.

In other words, inserting a different jack for a different type of data communication (i.e., for a different application) into the same jack makes it possible for the recording and reproducing apparatus 1 to deal with different data communication standards.

In one example, two MD jacks could be furnished separately on the recording and reproducing apparatus 1, one jack comprising electrode terminals for the communication of remote controller data, another jack including electrode terminals for data communication pursuant to IEEE 1394. Alternatively, as with the above embodiment, one MD jack 26 may be provided with electrode terminals dealing with the two different standards of data communication.

In the manner described, the recording and reproducing apparatus 1 of the invention may illustratively have one MD jack 26 addressing a plurality of standards of data communication. With the apparatus 1 designed to accommodate a plurality of data communication standards, there is no need to install any additional MD jack or data communication connectors.

Where audio data is exchanged between the recording and reproducing apparatus 1 and the data input and output device 200 over the data communication cable 202, a power supply line stemming from the terminal T16 is set up between the two units. The line and the terminal T16 allow the apparatus 1 to be powered illustratively from a power supply circuit of the data input and output device 200. In that case, there is no need to provide the recording and reproducing apparatus 1 with such power supplying means as batteries or an AC (alternating current) adapter. The absence of additional power supplying means save users the time of setting up the system.

In the data communication plug 210 of this embodiment, the headphone plug 212 remains a dummy plug. It follows that the headphone plug 212 could be omitted to leave the connector 213 alone serving as a functional connector. However, the provision of the headphone plug 212 renders the connector assembly sturdier than if the connector 213 alone were furnished. This contributes to enhancing mechanical reliability.

Although the headphone plug 212 remains a dummy plug in the data communication plug 210 of this embodiment, this is not limitative of the invention. Alternatively, a line may be derived from the headphone plug 212 through the interior of the cable 204.

The structures and specific shapes of the data communication plug and data communication jack embodying the invention are not limited to those shown in FIGS. 3, 4, 5A through 5C, or 6A through 6C. Such structures, shapes and formations may be altered as needed depending on the actual use conditions.

Illustratively, the electrodes furnished to the data communication plug and data communication jack may be arranged so that only their relevant electrodes will come into contact when they are connected. If the data communication jack has electrodes corresponding to other data communication standards, these electrodes need only be arranged so as to avoid contact with those of the data communication plug. The electrode arrangements may be modified as desired.

As described, the data communication plug embodying the invention has side A and side B, one of which is provided with electrode terminals. Alternatively, electrode terminals such as those for a power supply and ground may be furnished as common electrodes in the middle of either side where appropriate. In such a case, a combination of two different data communication plugs may be provided, one plug having a plurality of electrode terminals including the common terminals corresponding to a first data communication standard, another plug having a plurality of electrode terminals including the common terminals corresponding to a second data communication standard.

As another alternative, each of side A and side B may have its electrode terminals divided so as to address two communication standards. In that case, the plug assembly will have four data communication plugs dealing with four different communication standards. Further divisions of the electrode terminals on each of side A and side B will address more communication standards.

Although the data communication plug of this embodiment was shown having its connector comprising side A and side B, this is not limitative of the invention. Alternatively, the connector may be arranged to have three or more sides each carrying electrode terminals divided into a plurality of groups as described above.

The embodiments above were shown dealing with high-speed data communication pursuant to IEEE 1394 and low-speed data communication illustratively based on the TSB (time sharing bus). However, this is not limitative of the invention. The invention obviously applies to other data communication standards as well.

Furthermore, the data communication jack embodying the invention is not limited to the use on MD players compatible with MD systems. The inventive jack may also be incorporated in other digital audio equipment and digital audio-visual (AV) equipment. In addition, the data communication jack of the invention may be mounted on data input/output devices effecting the communication of data other than digital audio data.

As many apparently different embodiments of this invention may be made without departing from the spirit and scope thereof, it is to be understood that the invention is not limited to the specific embodiments thereof except as defined in the appended claims.

What is claimed is:

1. A jack comprising:
   an opening for selectively accommodating either a first plug or a second plug, said first plug including a first headphone plug and a first connector, said first connector having a plurality of first electrode terminals for performing data communication based on a first data communication standard, said second plug including a second headphone plug and a second connector, said second connector having a plurality of second electrode terminals for effecting data communication based on a second data communication standard;
   a plurality of first contacts for coming into contact with said plurality of first electrode terminals of said first plug when said first plug is inserted into said opening; and
   a plurality of second contacts for coming into contact with said plurality of second electrode terminals of said second plug when said second plug is inserted into said opening.

2. A jack according to claim 1, wherein at least one of said plurality of first or second contacts is used to transmit, receive or exchange power.

3. A jack according to claim 1, further comprises a second opening for accommodating an audio signal plug for inputting or outputting audio signals.

4. A jack according to claim 1, wherein said plurality of first contacts are positioned opposite to said plurality of second contacts inside said opening.

5. A jack according to claim 1, wherein said first data communication standard is pursuant to IEEE 1394.

6. A jack according to claim 1, wherein said second data communication standard involves extracting a clock signal from a data line.

7. A reproducing apparatus comprising:
   a jack comprising: an opening for selectively accommodating either a first plug or a second plug, said first plug having a plurality of first electrode terminals for performing data communication based on a first data communication standard, said second plug having a plurality of second electrode terminals for effecting data communication based on a second data communication standard; a plurality of first contacts for coming into contact with said plurality of first electrode terminals of said first plug when said first plug is inserted into said opening; and a plurality of second contacts for coming into contact with said plurality of second electrode terminals of said second plug when said second plug is inserted into said opening;
   reproducing means for reproducing information from a storage medium;
   first data converting means for converting the information from said reproducing means in accordance with said first data communication standard; and
   second data converting means for converting information regarding to operating status of said reproducing means in accordance with said second data communication standard.

8. A reproducing apparatus according to claim 7, wherein at least one of said plurality of first or second contacts of said jack is used to transmit, receive, or exchange power.

9. A reproducing apparatus according to claim 7, wherein said jack further comprises a second opening for accommodating an audio signal plug for inputting or outputting audio signals.

10. A reproducing apparatus according to claim 7, wherein said plurality of first contacts are positioned opposite to said plurality of second contacts inside said opening.

11. A reproducing apparatus according to claim 7, wherein said first data communication standard is pursuant to IEEE 1394.

12. A reproducing apparatus according to claim 7, wherein said second data communication standard involves extracting a clock signal from a data line.

13. A data communication system comprising:
   either a first plug or a second plug, said first plug including a first headphone plug and a first connector, said first connector having a plurality of electrode terminals for performing data communication based on a first data communication standard, said second plug including a second headphone plug and a second connector, said second connector having a plurality of electrode terminals for effecting data communication based on a second data communication standard; and
   a jack comprising:
      an opening for selectively accommodating said first or said second plug;
      a plurality of first contacts for coming into contact with said plurality of first electrode terminals of said first plug when said first plug is inserted into said opening; and
      a plurality of second contacts for coming into contact with said plurality of second electrode terminals of said second plug when said second plug is inserted into said opening.

14. A data communication system according to claim 13, wherein at least one of said plurality of first or second contacts of said jack is used to transmit, receive, or exchange power.

15. A data communication system according to claim 13, wherein said jack further comprises a second opening for accommodating an audio signal plug for inputting or outputting audio signals.

16. A data communication system according to claim 13, wherein said plurality of first contacts are positioned opposite to said plurality of second contacts inside said opening.

17. A data communication system according to claim 13, wherein said first data communication standard is pursuant to IEEE 1394.

18. A data communication system according to claim 13, wherein said second data communication standard involves extracting a clock signal from a data line.

19. A jack comprising:

an opening for selectively accommodating either a first plug or a second plug, said first plug having a plurality of first electrode terminals for performing data communication based on a first data communication standard, said second plug having a plurality of second electrode terminals for effecting data communication based on a second data communication standard, the shape of the second plug being substantially similar to the shape of the first plug;

a plurality of first contacts for coming into contact with said plurality of first electrode terminals of said first plug when said first plug is inserted into said opening; and a plurality of second contacts for coming into contact with said plurality of second electrode terminals of said second plug when said second plug is inserted into said opening.

20. A jack according to claim 19, wherein said first data communication standard is pursuant to a USB format.

21. A jack according to claim 1, wherein said first data communication standard is pursuant to a USB format.

22. A jack according to claim 8, wherein said first data communication standard is pursuant to a USB format.

23. A jack according to claim 13, wherein said first data communication standard is pursuant to a USB format.

* * * * *